United States Patent
Maeno

(10) Patent No.: US 9,821,666 B2
(45) Date of Patent: Nov. 21, 2017

(54) CHARGE CONTROL DEVICE USING AN IN-VEHICLE SOLAR CELL

(71) Applicant: Seigen Maeno, Toyota (JP)

(72) Inventor: Seigen Maeno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 14/890,277

(22) PCT Filed: May 17, 2013

(86) PCT No.: PCT/JP2013/063813
§ 371 (c)(1),
(2) Date: Nov. 10, 2015

(87) PCT Pub. No.: WO2014/184954
PCT Pub. Date: Nov. 20, 2014

(65) Prior Publication Data
US 2016/0089986 A1     Mar. 31, 2016

(51) Int. Cl.
*H01M 10/44*   (2006.01)
*H01M 10/46*   (2006.01)
(Continued)

(52) U.S. Cl.
CPC ........... *B60L 11/1801* (2013.01); *B60L 1/003* (2013.01); *B60L 8/003* (2013.01); *B60L 11/005* (2013.01);
(Continued)

(58) Field of Classification Search
USPC .................................................. 320/101, 102
See application file for complete search history.

(56) References Cited

U.S. PATENT DOCUMENTS

| | | | |
|---|---|---|---|
| 2009/0001926 A1* | 1/2009 | Sato | ............ B60L 3/0046 320/102 |
| 2009/0289594 A1* | 11/2009 | Sato | ............ G05F 1/67 320/101 |

(Continued)

FOREIGN PATENT DOCUMENTS

| JP | H05111112 A | 4/1993 |
|---|---|---|
| JP | 2012-056357 A | 3/2012 |

(Continued)

*Primary Examiner* — Brian Ngo
(74) *Attorney, Agent, or Firm* — Oliff PLC

(57) ABSTRACT

When the amount of charge of a temporary battery exceeds a predetermined amount of charge, a solar ECU31 constitutes a charge controller pumps up and boosts power stored in the battery collaborating with a solar charger of a power supply portion, and carries out pumping charge in a main electric storage. While the solar ECU31 carries out the pumping charge, the power supply portion solar charger supplies the generated power from an in-vehicle solar cell to solar ECU31 when the power generated by the in-vehicle solar cell is a predetermined power or less, and supplies the generated power from an in-vehicle solar cell to solar ECU31 and main battery when the power generated by the in-vehicle solar cell is larger than the predetermined power. Even where the pumping charge is being carried out, the power which the in-vehicle solar cell is continuously generating can be used without being discarded futilely.

3 Claims, 7 Drawing Sheets

(51) Int. Cl.
  *B60L 11/18*   (2006.01)
  *H02J 7/35*    (2006.01)
  *B60L 1/00*    (2006.01)
  *B60L 8/00*    (2006.01)
  *B60L 11/00*   (2006.01)
  *B60L 11/12*   (2006.01)
  *B60L 11/14*   (2006.01)

(52) U.S. Cl.
  CPC ............ *B60L 11/123* (2013.01); *B60L 11/14* (2013.01); *B60L 11/1809* (2013.01); *B60L 11/1816* (2013.01); *B60L 11/1861* (2013.01); *B60L 11/1868* (2013.01); *H02J 7/35* (2013.01); *B60L 2210/14* (2013.01); *B60L 2210/40* (2013.01); *B60L 2220/14* (2013.01); *Y02T 10/6217* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 10/7077* (2013.01); *Y02T 10/7083* (2013.01); *Y02T 10/7225* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 2011/0187184 A1* | 8/2011 | Ichikawa | B60L 1/003 307/10.1 |
| 2012/0133322 A1 | 5/2012 | Walsh et al. | |
| 2013/0054069 A1 | 2/2013 | Komiya et al. | |
| 2013/0320911 A1* | 12/2013 | Kamiya | H02J 7/025 320/101 |
| 2015/0349582 A1* | 12/2015 | Maeno | B60L 3/0046 320/101 |

FOREIGN PATENT DOCUMENTS

| | | |
|---|---|---|
| JP | 2012-075242 A | 4/2012 |
| JP | 2013-066365 A | 4/2013 |

\* cited by examiner

CHARGE CONTROL DEVICE USING AN IN-VEHICLE SOLAR CELL

TECHNICAL FIELD

The present invention relates to a charge control device which controls charging of a battery mounted on a vehicle using an in-vehicle solar cell.

BACKGROUND ART

In recent years, a charge control device which controls charging of a battery mounted on a vehicle using a solar cell (sunlight energy) has been proposed positively. For instance, in a controller of an electric vehicle disclosed in the following patent document 1 (PTL1), an electric power generated by a sunlight panel installed outside is supplied to an auxiliary battery which supplies an electric power to electrical apparatus inside the vehicle. And, this conventional controller boosts the electric power of an auxiliary battery and charges a main battery which supplies an electric power to a motor when the remaining capacity of the auxiliary battery reaches a predetermined value.

CITATION LIST

Patent Literature

[PTL1] Japanese Patent Application Laid-Open (kokai) No. 2012-75242

SUMMARY OF INVENTION

By the way, in the above-mentioned conventional controller, the sunlight panel is mounted on the vehicle and a case where the electric power generated by this sunlight panel is supplied to the auxiliary battery can be assumed. In this case, in the above-mentioned controller, when a pumping charge in which the electric power of the auxiliary battery is boosted and the main battery is charged thereby, the destination of the electric power generated by the sunlight panel becomes unidentified. Therefore, when the pumping charge is being carried out, there is a possibility that the electric power generated by the sunlight panel, i.e. renewable energy, cannot be effectively used.

The present invention has been conceived in order to solve the above-mentioned problem, and one of the objectives thereof is in providing a charge control device using an in-vehicle solar cell and improved so that the electric power generated by the in-vehicle solar cell can be effectively used.

A charge control device using an in-vehicle solar cell according to the present invention for attaining the above-mentioned objective is applied to a vehicle that has a generator motor for generating a driving force and a main electric storage device electrically connected with said generator motor to supply an electric power thereto and that can run using at least said driving force generated by said generator motor. Here, as such vehicles, an electric vehicle (EV) and a hybrid vehicle (HV), and a plug-in hybrid vehicle (PHV) can be employed.

And, the charge control device using an in-vehicle solar cell according to the present invention is configured to comprise an electric power supply portion and a charge control portion. Said electric power supply portion has an in-vehicle solar cell mounted on a vehicle and a temporary electric storage device for temporarily storing the electric power generated by said in-vehicle solar cell, and supplies the electric power. Said charge control portion controls charging of said main electric storage device and said temporary electric storage device, in cooperation with said electric power supply portion. Here, as said main electric storage device and said temporary electric storage device, a secondary battery (storage battery) or electric double layer capacitor etc., which is chargeable and dischargeable, can be employed.

One of the features of the charge control device using the in-vehicle solar cell according to the present invention is in that, when the amount of charge of said temporary electric storage device exceeds a predetermined amount of charge and said charge control portion is charging said main electric storage device with the electric power temporarily stored in said temporary electric storage device, said electric power supply portion supplies the electric power generated by said in-vehicle solar cell to at least said charge control portion between said charge control portion and said main electric storage device.

In accordance with this, when the amount of charge of the temporary electric storage device exceeds the predetermined amount of charge, the charge control portion can collaborate with the electric power supply portion to charge the electric power temporarily stored in the temporary electric storage device in the main electric storage device. In addition, in this case, it is also possible to carry out a pumping charge in which the electric power temporarily stored in the temporary electric storage device is pumped up and boosted and charged in the main electric storage device. Thus, while the charge control portion is charging (pumping charge), the electric power supply portion can supply the electric power generated from the in-vehicle solar cell at least to the charge control portion out of the charge control portion and the main electric storage device. Thereby, even in a situation where charge (pumping charge) is carried out, the electric power which the in-vehicle solar cell is continuously generating, in other words, renewable energy, can be effectively used by the charge control portion's operating and controlling charge. Alternatively, by charging the electric power in the main electric storage device and making the generator motor generate a driving force, the electric power can be effectively used.

In this case, more concretely, said electric power supply portion can supply the generated electric power from said in-vehicle solar cell to said charge control portion, when the electric power generated by said in-vehicle solar cell is a predetermined electric power or less. Moreover, said electric power supply portion can supply the generated electric power from said in-vehicle solar cell to said charge control portion and said main electric storage device, when the electric power generated by said in-vehicle solar cell is larger than said predetermined electric power.

In accordance with this, according to the extent of the electric power generated by the in-vehicle solar cell, the electric power generated from the in-vehicle solar cell is supplied to the charge control portion when the electric power generated by the in-vehicle solar cell is the predetermined electric power or less, and the electric power generated from the in-vehicle solar cell is supplied to the charge control portion and the main electric storage device when it is larger than the predetermined electric power. Therefore, even in a situation where charge (pumping charge) is carried out, the electric power which the in-vehicle solar cell is continuously generating, in other words, renewable energy, can be more certainly supplied to the charge control portion and the main electric storage device and can be effectively used without being discarded futilely.

Moreover, in this case, said predetermined electric power can be set up based on a total power consumption consumed by the operations of a plurality of auxiliary machines and a plurality of electronic control instruments mounted on said vehicle, and said electric power supply portion, while supplying the generated electric power from said in-vehicle solar cell to a plurality of auxiliary machines and a plurality of electronic control instruments mounted on said vehicle, can supply a remaining surplus electric power obtained by subtracting said total power consumption from the generated electric power, from said in-vehicle solar cell to said main electric storage device, when the electric power generated by said in-vehicle solar cell is larger than a predetermined electric power set up based on said total power consumption.

In accordance with this, the electric power supply portion can supply the electric power generated by the in-vehicle solar cell to the charge control portion, a plurality of auxiliary machines and a plurality of electronic control instruments mounted on the vehicle. And, when the electric power generated by the in-vehicle solar cell is larger than the predetermined electric power set up based on the total power consumption consumed by the operations of a plurality of auxiliary machine and a plurality of electronic control instruments mounted on the vehicle, the electric power supply portion can supply the surplus electric power obtained by subtracting the total power consumption from the electric power generated by the in-vehicle solar cell, from the in-vehicle solar cell to the main electric storage device, while supplying the electric power generated by the in-vehicle solar cell from the in-vehicle solar cell to the charge control portion, a plurality of auxiliary machines and a plurality of electronic control instruments mounted on the vehicle. Therefore, even in a situation where charge (pumping charge) is carried out, the electric power which the in-vehicle solar cell is continuously generating, in other words, renewable energy, can be very efficiently and effectively used.

Moreover, in this case, said electric power supply portion, while supplying the generated electric power from said in-vehicle solar cell to said charge control portion, can supply a remaining surplus electric power obtained by subtracting power consumption consumed in association with the operation of said charge control portion from the generated electric power, from said in-vehicle solar cell to a plurality of auxiliary machines and a plurality of electronic control instruments mounted on said vehicle, when the electric power generated by said in-vehicle solar cell is a predetermined electric power set up based on said total power consumption or less.

In accordance with this, when the electric power generated by the in-vehicle solar cell is the predetermined electric power set up based on the total power consumption consumed by the operations of a plurality of the auxiliary machines and a plurality of the electronic control instruments or less, the electric power supply portion can supply the surplus electric power obtained by subtracting the electric power consumed in association with the operation of the charge control portion from the electric power generated by the in-vehicle solar cell, from the in-vehicle solar cell to a plurality of the auxiliary machines and a plurality of the electronic control instruments mounted on the vehicle, while supplying the electric power generated by the in-vehicle solar cell from the in-vehicle solar cell to the charge control portion. Therefore, even in a situation where charge (pumping charge) is carried out, the electric power which the in-vehicle solar cell is continuously generating, in other words, renewable energy, can be very efficiently and effectively used.

DESCRIPTION OF EMBODIMENTS

Hereafter, a charge control device using an in-vehicle solar cell and according to one embodiment of the present invention (hereafter, simply referred to as "the present device") will be explained, referring to drawings.

Figure 1:
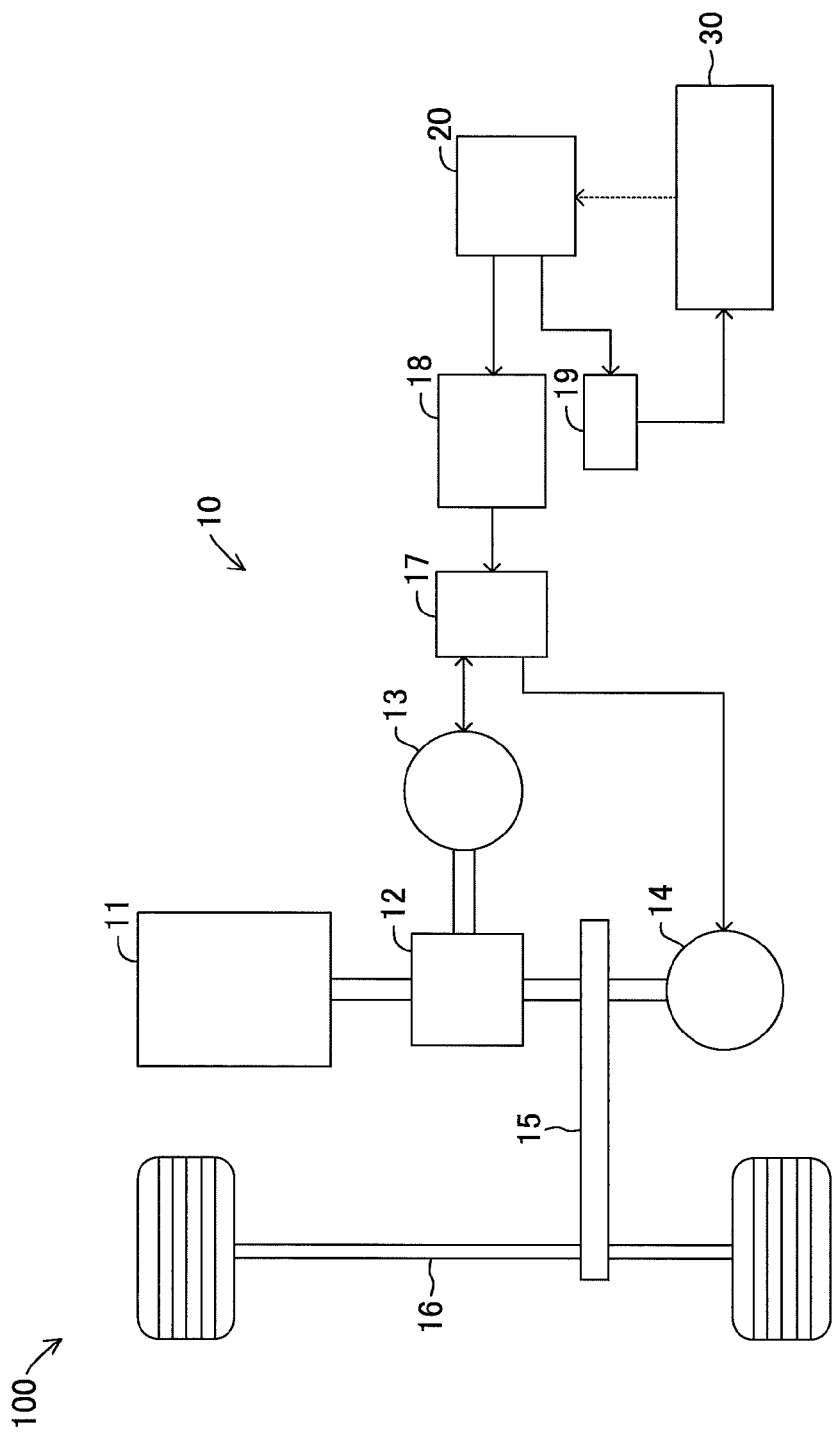
FIG. 1 is a schematic functional block diagram of a vehicle to which a charge control device using an in-vehicle solar cell and according to an embodiment of the present invention is applied.

FIG. 1 is a block diagram for showing the configuration of a vehicle 100 to which the present device can be applied. Here, as the vehicle 100 to which the present device can be applied, for instance, an EV which comprises a motor generator as a generator motor driven by the electric power of a main battery as a main electric storage device mounted thereon and charges the main battery using a regeneration electric power and an external power supply which is supplied from a charging stand, etc., an HV which also comprises an engine in addition to an motor generator, and a PHV which can charge a main battery further using an external power supply in addition to an HV can be employed. In addition, in the present embodiment, a case where the vehicle 100 is a PHV will be exemplified and explained.

The vehicle 100 in the present embodiment comprises, in addition to a driving force generation portion 10, an electric power supply portion 20 and a charge controller 30 which constitute the present device, as shown in FIG. 1. The driving force generation portion 10 is constituted by an engine 11, a power splitting mechanism 12, motor generators 13 and 14, a transmission gear 15, a driving shaft 16, a power control unit (PCU) 17, a main battery 18, and a sub-battery 19. The engine 11 outputs power by combustion of hydro-carbon system fuel, such as gasoline and light oil. And, in the vehicle 100, the power (kinetic energy) outputted by the engine 11 drives the transmission gear 15 which transmits power to the driving shaft 16 (axle shaft) through the power splitting mechanism 12.

The power splitting mechanism 12 is combined with the engine 11, the motor generator 13 (14) and the transmission gear 15, and distributes power among these. Here, as the power splitting mechanism 12, a planetary gear which has three axes of rotation of a sun gear, a planetary carrier and a ring gear can be employed, for example, and the motor generator 13 is connected to the sun gear, the engine 11 is connected to the carrier, and the axle shaft 16 and the motor generator 14 are connected to the ring gear through the transmission gear 15.

The motor generators 13 and 14 are controlled by the PCU17, and it is a three-phase synchronous type generator motor which functions as an electric motor when an electric power is supplied from the main battery 18 and functions as a dynamo when a power (kinetic energy) is transmitted from the exterior (for instance, the engine 11). Concretely, the motor generator 13 functions also as a starter motor which can start up the engine 11 while the power (kinetic energy) of the engine 11 divided by the power splitting mechanism 12 is transmitted thereto and it functions as a dynamo. The motor generator 14 functions as an electric motor (power source) which drives the transmission gear 15 for transmitting a driving force to the driving shaft 16 (axle shaft). In addition, although the motor generator 13 functions as a dynamo and the motor generator 14 functions as an electric motor in the present embodiment, it is needless to say that the motor generator 14 may function as a dynamo and the motor generator 13 may function as an electric motor, alternatively both the motor generators 13 and 14 may function as a dynamo or may function as an electric motor.

The main battery 18 as a main electric storage device is what is called a high-voltage power supply, and is electrically connected with the motor generators 13 and 14 through the PCU17. The sub-battery 19 as a sub-electric storage device is the so-called auxiliary battery of a low-voltage power supply, and is electrically connected to various electronic control units (a plurality of electronic control instruments) including the charge controller 30 mounted on the vehicle 100 and/or a plurality of auxiliary machines mounted on the vehicle 100.

Figure 2:
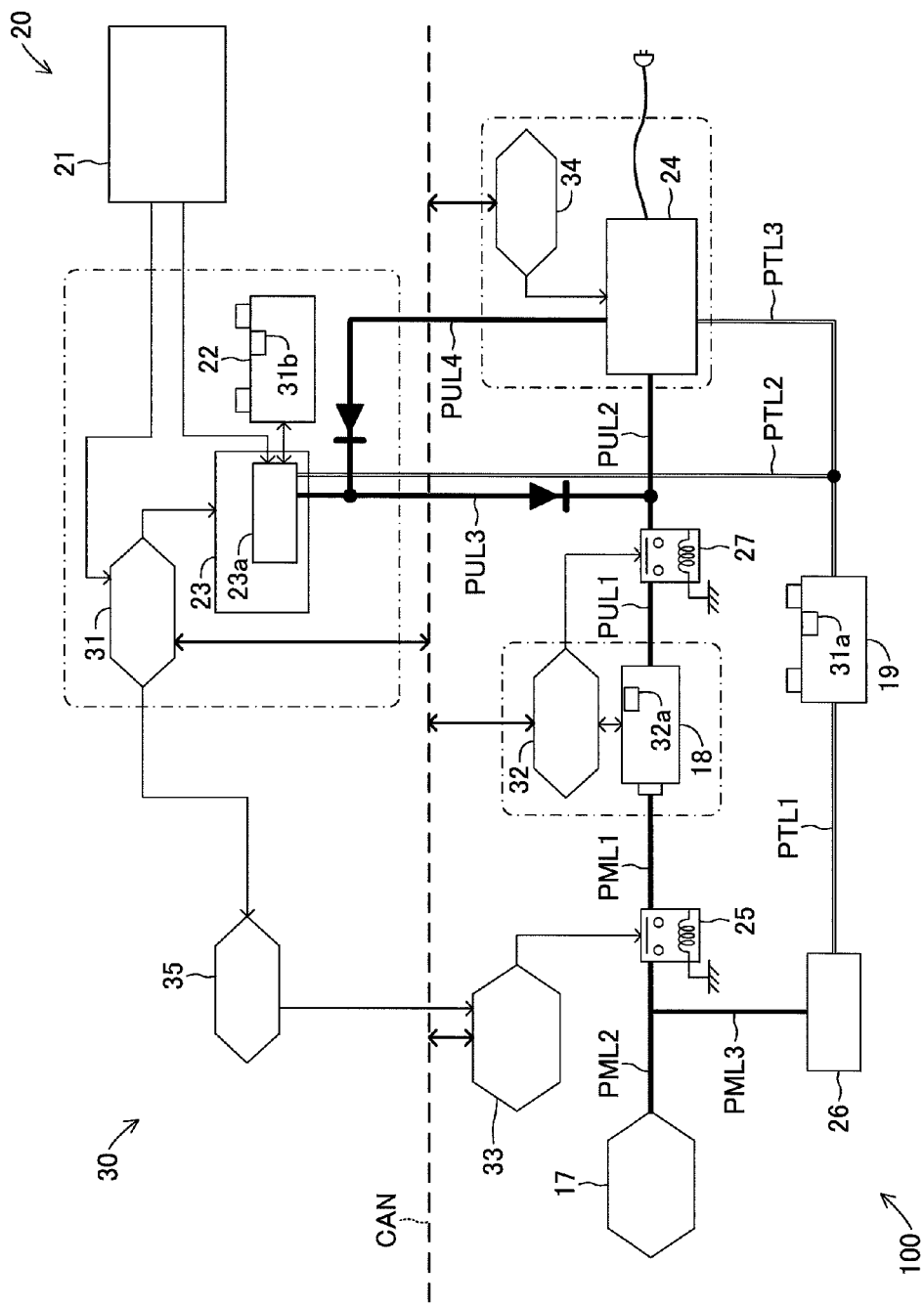
FIG. 2 is a block diagram for schematically showing the configuration of the electric power supply portion and charge controller which are mounted on the vehicle in FIG. 1.

The electric power supply portion 20 comprises an in-vehicle solar cell 21 and a temporary battery 22 as a temporary electric storage device, as shown in FIG. 2. For example, the in-vehicle solar cell 21 is disposed in the roof of the vehicle 100, etc., and converts a sunlight energy into an electrical energy. In addition, in the following explanation, the electric power generated by the in-vehicle solar cell 21 may be referred to as the "electric power by a photovoltaic power generation." The temporary battery 22 temporarily charges the low-voltage electric power generated by the in-vehicle solar cell 21, and outputs the electric power to the main battery 18 or/and the sub-battery 19, as will be mentioned later. For this reason, the temporary battery 22 is electrically connected to the main battery 18, the sub-battery 19 and the in-vehicle solar cell 21 through a solar charger 23 which will be mentioned later.

Moreover, the electric power supply portion 20 comprises the solar charger 23 and a plug-in charger 24. The solar charger 23 supplies the electric power generated by the in-vehicle solar cell 21 to at least one or more of the main battery 18, the sub-battery 19 and the temporary battery 22, and supplies the electric power temporarily stored in the temporary battery 22 to the main battery 18 or/and the sub-battery 19. For this reason, as shown in FIG. 2, the solar charger 23 comprises a charge control circuit 23a which selectively switches, as an electric power supply destination, among the main battery 18, the sub-battery 19 and the temporary battery 22 and supplies the electric power thereto. In addition, although it is not shown, the charge control circuit 23a has a DC/DC converter for high-voltage charge, which pumps up the electric power generated by the in-vehicle solar cell 21 or the low-voltage electric power stored in the temporary battery 22 to a high voltage (pumping) and supplies the same to the main battery 18, and a DC/DC converter for low-voltage charge, which supplies the electric power generated by the in-vehicle solar cell 21 to the sub-battery 19 or the temporary battery 22.

For example, the plug-in charger 24 is electrically connected to a charging stand etc. which is installed in a house or a public facility, etc. through a cable or non-contact connection, converts alternative-current (AC) electric power supplied as an external power supply (specifically, a commercial power) into a direct-current (DC) electric power, and supplies the electric power mainly to charge the main battery 18. For this reason, although it is not shown, the plug-in charger 24 comprises an electric circuit which consists of a smoothing capacitor, a voltage converter, an inverter circuit, etc., for example.

Moreover, the electric power supply portion 20 comprises a system main electric relay 25 disposed on a drive electric power supply route which connects the main battery 18 and the PCU17 (more particularly, the motor generators 13 and 14), as shown in FIG. 2. The system main electric relay 25 is disposed between a high-voltage power-supply line PML1 on the side of the main battery 18 and a high-voltage power-supply line PML2 on the side of the PCU17, and selectively switches between the connection and disconnection between the PCU17 (i.e., the motor generators 13 and 14) and the main battery 18 by its opening-and-closing operation. Moreover, the electric power supply portion 20 comprises a DC/DC converter 26 disposed between a high-voltage power-supply line PML3, which is connected to the high-voltage power-supply line PML2 on the side of the PCU17, and the sub-battery 19, as shown in FIG. 2.

The DC/DC converter 26 transforms (lowers) the high-voltage power supply in the high-voltage power-supply line PML3 which is an upstream side to a low voltage, and supplies a low-voltage power supply to the sub-battery 19 through a low-voltage power-supply line PTL1 which is a downstream side. Here, as shown in FIG. 2, the solar charger 23 and the sub-battery 19 are electrically connected through a low-voltage power-supply line PTL2, and the plug-in charger 24 and the sub-battery 19 are electrically connected through a low-voltage power-supply line PTL3. In addition, in FIG. 2, a bold solid line shows a power-supply line to which a high-voltage power supply is applied, and a double line shows a power-supply line to which a low-voltage power supply is applied.

Furthermore, the electric power supply portion 20 comprises an electric relay 27 for charge which is disposed on a charge electric power supply route connecting the solar charger 23 and the plug-in charger 24 with the main battery 18, as shown in FIG. 2. The electric relay 27 for charge is disposed between a charge power supply line PUL1 on the side of the main battery 18 and a charge power supply line PUL2 on the side of the plug-in charger 24 (solar charger 23). Here, the solar charger 23 is electrically connected to the charge power supply line PUL2 through a charge power supply line PUL3. Moreover, the plug-in charger 24 is electrically connected to the charge power supply line PUL3 through s charge power supply line PUL4, while being directly connected to the charge power supply line PUL2. In addition, a backflow-prevention diode which prevents the flow of a current from the charge power supply line PUL2 side to the solar charger 23 side is disposed in the charge power supply line PUL3, a backflow-prevention diode which prevents the flow of a current from the charge power supply line PUL3 side to the plug-in charger 24 side is disposed in the charge power supply line PUL4.

In addition, since the plug-in charger 24 is thus connected to the charge power supply line PUL3 through the charge power supply line PUL4, when the electric power is supplied to the main battery 18 from the solar charger 23, the plug-in charger 24 can supply an electric power (current) to the main battery 18 through the charge power supply line PUL3 electrically connected to the charge power supply line PUL4 and the Solar charger 23. Namely, when the electric power by a photovoltaic power generation is supplied from the solar charger 23, the electric power (current) supplied from an external power supply can be merged into the electric power (current) being supplied through the charge power supply line PUL3, and can be supplied to the main battery 18.

Thereby, the electric power from an external power supply and the electric power by a photovoltaic power generation can provide for the electric power required for charging the main battery 18. Namely, the electric energy supplied from the plug-in charger 24 is the electric energy obtained by subtracting the electric energy supplied from the solar charger 23 from the electric energy required for charging the main battery 18. Therefore, when the electric power from the solar charger 23 is used together in a plug-in charge, the electric power (current) supplied from an external power supply for charging the main battery 18 decreases. Thereby, the charge cost which a driver of the vehicle 100 bears in association with using an external power supply (commercial power) can be saved.

Moreover, the proportion of the electric power supplied from the solar charger 23, i.e., the electric power by the photovoltaic power generation which is renewable energy in the electric power charged in the main battery 18 can be positively raised. Thereby, for example, depending on the district the vehicle 100 runs, the fuel consumption (electricity consumption) according to the proportion of the electric power by a photovoltaic power generation is counted, and the driver of the vehicle 100 may be able to receive preferential treatment from a viewpoint of an environmental protection in association with the improvement in a fuel consumption (electricity consumption).

As shown in FIG. 2, the charge controller 30 comprises a solar ECU31 which constitutes the charge control portion of the present device and a cell ECU32.

The solar ECU31 is a microcomputer which uses CPU, ROM, RAM, etc. as principal component parts, and while an electric power is directly supplied from the in-vehicle solar cell 21 of the electric power supply portion 20, an electric power is supplied also from the sub-battery 19 (refer to FIG. 1). And, the solar ECU31 controls an overall operation of the solar charger 23, and thereby supplies the electric power generated by the in-vehicle solar cell 21 to at least one or more of the main battery 18, the sub-battery 19 and the temporary battery 22 to control charging, and supplies the electric power charged in the temporary battery 22 to the main battery 18 or/and the sub-battery 19 to control charging. Here, well-known charge sensors 31a and 31b are connected to the solar ECU31. These charge sensors 31a and 31b are attached to the sub-battery 19 and the temporary battery 22 respectively, detect the amounts of charge (SOC: State Of Charge) in the sub-battery 19 and the temporary battery 22, and outputs signals showing SOC to the solar ECU31. Here, the amount of charge (SOC) shows the proportion of the remaining amount of charge to the charge capacity (at the time of full charge) of the battery. Thereby, the solar ECU31 controls charging based on the amounts of charge (SOCs) of the sub-battery 19 and the temporary battery 22 detected by the charge sensors 31a and 31b.

The cell ECU32 is also a microcomputer which uses CPU, ROM, RAM, etc. as principal component parts, monitors the charge status of the main battery 18, and controls an operation of the electric relay 27 for charge to control overall charging of the main battery 18. Here, a well-known charge sensor 32a is connected also to cell ECU32. This charge sensor 32a is attached to the main battery 18, detects SOC which is the amount of charge of the main battery 18, and outputs a signal showing SOC to the cell ECU32. Thereby, the cell ECU32 controls charging based on the amount of charge (SOC) of the main battery 18 detected by the charge sensor 32a. In addition, the cell ECU32 is configured to be supplied an electric power from the sub-battery 19 (refer to FIG. 1).

Moreover, a hybrid ECU33 is included in the charge controller 30, as shown in FIG. 2. The hybrid ECU33 operates the engine 11 and the motor generators 13 and 14 in cooperation to control the driving force for driving the vehicle 100. For this reason, the hybrid ECU33 is a microcomputer which uses CPU, ROM, RAM, etc. as principal component parts, and controls a switching operation of the system main electric relay 25 at the time of running of the vehicle 100 and charging of the vehicle 100. In addition, the hybrid ECU33 is also configured to be supplied an electric power from the sub-battery 19 (refer to FIG. 1).

Furthermore, a plug-in ECU34 is also included in the charge controller 30. The plug-in ECU34 controls an overall operation of the plug-in charger 24. For this reason, the plug-in ECU34 is also a microcomputer which uses CPU, ROM, RAM, etc. as principal component parts. In addition, the plug-in ECU34 is also configured to be supplied an electric power from the sub-battery 19 (refer to FIG. 1).

Here, the hybrid ECU33 strictly performs a high-voltage system management and a high-voltage battery control in connection with the main battery 18, a management of opening-and-closing operations of the system main electric relay 25 and the electric relay 27 for charge which constitute an electrical apparatus, and a power-supply control required for running of the vehicle 100, etc. by collaborating at least with the cell ECU32. For this reason, in the vehicle 100, although an illustration is omitted since it is well-known, various electrical apparatus and various electronic control instruments are prepared around the main battery 18, these various electrical apparatus etc. are configured to perform the above-mentioned various managements and controls and thereby certainly secure the reliability and safety of the vehicle 100 mounting the high-voltage main battery 18.

And, as shown in FIG. 2, these solar ECU31, cell ECU32, hybrid ECU33 and plug-in ECU34 are prepared to be mutually communicable through a communication line (for instance, CAN communication line) built in the vehicle 100. Here, as shown in FIG. 2, especially the solar ECU31 and hybrid ECU33 are directly connected through a collation ECU35 (microcomputer). Thereby, it is configured to become possible for the solar ECU31 to communicate with the hybrid ECU33 and directly supply various signals (start-up signal etc.) after the collation by the collation ECU35. In addition, the collation ECU35 is also configured to be supplied an electric power from the sub-battery 19 (refer to FIG. 1).

Next, the operation of the charge controller 30 will be explained concretely. First, the operation at the time of running of the vehicle 100 will be explained. When an ignition (I/G) which is not shown is made into an ON state by a driver and the hybrid ECU33 switches the system main electric relay 25 to a closed status (connected status) and controls it, the vehicle 100 will be in a status in which it can run at least using driving force of the motor generator 14, a status of what is called "Ready ON." In addition, more particularly, when the SOC of the main battery 18 managed by the cell ECU32 is more than a predetermined SOC, the hybrid ECU33 switches the system main electric relay 25 to a closed status (connected status) and controls it, and thereby the vehicle 100 will be in the status of "Ready ON."

Namely, in the status of "Ready ON", the high-voltage power-supply line PML1 on the side of the main battery 18 and the high-voltage power-supply line PML2 on the side of PCU17 are maintained in a status that they are connected by various electrical apparatus including the system main electric relay 25. Thereby, while the vehicle 100 is running, the hybrid ECU33 collaborates with the cell ECU32 and supplies a high-voltage electric power from the main battery 18 to the motor generator 14 (13) through the PCU17 in accordance with a well-known power-supply regulation. Therefore, the motor generator 14 (13) generates a predetermined driving force according to an accelerator operation by a driver, and gives the driving force to the driving shaft 16 (wheel) through the transmission gear 15, for example.

On the other hand, when the vehicle 100 is running, more particularly, when the vehicle 100 is in the status of "Ready ON", the hybrid ECU33 makes the cell ECU32 switch the electric relay 27 to an opened status (disconnected status) and control it. Thereby, a status that the charge power supply line PUL1 on the side of the main battery 18 and the charge power supply line PUL2 on the side of the plug-in charger 24 (solar charger 23) are disconnected by various electrical apparatus including the electric relay 27 for charge is maintained. Namely, when the vehicle 100 is running, in accordance with a well-known high-voltage system management and high-voltage battery management, a status that the main battery 18 is completely (strictly) disconnected from the solar charger 23 and the plug-in charger 24 is maintained.

Thereby, when the vehicle 100 is running, the main battery 18 is prevented from an electric power being supplied from the solar charger 23 and being charged. In addition, since the electric connection between the plug-in charger 24 and a charging station installed in the exterior of the vehicle 100 is not established when the vehicle 100 is running, the main battery 18 is not charged using an external power supply.

Here, in a situation where the vehicle 100 slows down (for instance, a situation where a brake operation by a driver is made), the hybrid ECU33 carries out the regeneration regulation by the motor generator 13 (14) through the PCU17, converts the kinetic energy of the vehicle 100 into an electrical energy, and collects it. Namely, when the vehicle 100 slows down, in accordance with the regeneration regulation by the hybrid ECU33 and the PCU17, the motor generator 13 (14) converts the kinetic energy transmitted from the driving shaft 16 (wheel) through the moderation gear 15 and the power splitting mechanism 12 into an electrical energy.

And, the PCU17 outputs this changed electrical energy, in other words, the collected electric power, to the high-voltage power-supply line PML2 as a regeneration electric power. Since the vehicle 100 is in the status of "Ready ON" and the system main electric relay 25 is maintained in a closed status (connected status) at this time, the high-voltage power-supply line PML2 is connected with the high-voltage power-supply line PML1 on the side of the main battery 18. Thereby, when a regeneration electric power is outputted in association with a regeneration regulation, the regeneration electric power is boosted by various electrical apparatus (specifically, a DC/DC converter etc.) which is not shown, and charged in the main battery 18. Alternatively, the regeneration electric power outputted to the high-voltage power-supply line PML3 in association with the regeneration regulation is lowered by the DC/DC converter 26, outputted to the low-voltage power-supply line PTL1, and charged in the sub-battery 19.

Next, the charge control on the main battery 18, the sub-battery 19 and the temporary battery 22 of the vehicle 100 by the charge controller 30 will be explained for each situation.

As mentioned above, the solar ECU31 is electrically and directly connected with the in-vehicle solar cell 21, without interposing an electric storage device (electrical-double-layer capacitor etc.) which stores an electric power. Therefore, when it is a situation where the in-vehicle solar cell 21 can generate electricity, specifically when it is sunny daytime, the in-vehicle solar cell 21 will convert a sunlight energy into an electrical energy to generate an electric power, and will supply the electric power to the solar ECU31 directly. This starts up the solar ECU31 with a start-up voltage which has almost the same augmentation gradient (rise) as that in association with a power generation of the in-vehicle solar cell 21, in other words, with a start-up voltage which has not delayed as compared to the augmentation gradient of the voltage in the in-vehicle solar cell 21. Here, a power generation amount P (W) is defined as an electric power by a photovoltaic power generation, and a power consumption L1 (W) is defined as an electric power required for the start-up and operation of the solar ECU31. In this case, for example, in a situation where a power generation amount P is less than a power consumption L1 due to bad weather, etc., the solar ECU31 cannot be started even if the electric power by a photovoltaic power generation is supplied. Namely, in this case, since the solar ECU31 does not start, the electric power by a photovoltaic power generation is not supplied to the main battery 18, the sub-battery 19 and the temporary battery 22.

In addition, when the power generation amount P is not enough to start up the solar ECU31 as the above, the electric power by a photovoltaic power generation is likely to be consumed, for example, due to a loss in supplying an electric power to each of batteries 18, 19 and 22 (for instance, internal resistance of each battery), etc. Therefore, even though the solar ECU31 is started up by the electric power supply from the sub-battery 19, the electric power to be supplied from the in-vehicle solar cell 21 to each of the batteries 18, 19 and 22 cannot be secured, but the electric power in the sub-battery 19 is wasted for the start-up of the solar ECU31 instead. For this reason, the solar ECU31 does not control the charge to each of the battery 18, 19 and 22 in a situation where the power generation amount P is less than the power consumption L1.

(1) Case of L1<P≤Lall

Figure 3:
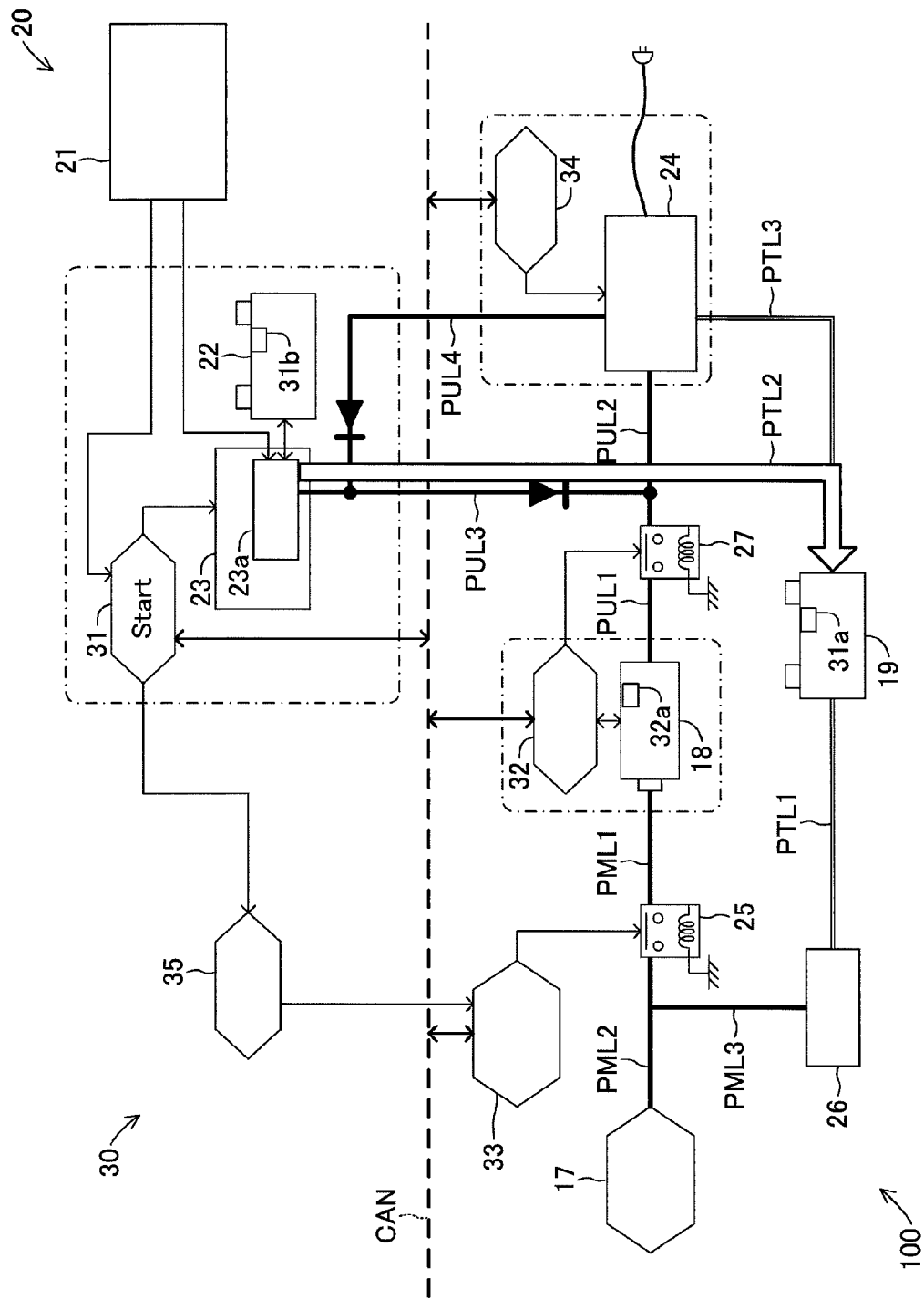
FIG. 3 is a figure for explaining a case where the charge destination of the electric power generated by the in-vehicle solar cell is a sub-electric storage device (sub-battery).

In a case where the power generation amount P by the in-vehicle solar cell 21 is larger than the power consumption L1 of the solar ECU31 and it is a total power consumption Lall (predetermined electric power) by a plurality of auxiliary machines and a plurality of electronic control instruments which are mounted on the vehicle 100 and operate when an ignition (I/O) is in an ON-state, the solar charger 23 supplies the electric power by a photovoltaic power generation to the solar ECU31 and the solar ECU31 starts up using the electric power by a photovoltaic power generation, as shown in FIG. 3. And, the solar ECU31 supplies a surplus electric power (P−L1) obtained by subtracting the power consumption L1 accompanying its own operation from the power generation amount P according to the following priorities, and controls charging.

Concretely, the solar ECU31 supplies the surplus electric power (P−L1) according to the following order, and controls charging.

a) supplies the surplus electric power (P−L1) to the sub-battery 19 whose SOC is a predetermined SOCs or less, b) when the SOC of the sub-battery 19 exceeds the predetermined SOCs, supplies the surplus electric power (P−L1) to the temporary battery 22, and c) when the SOC of the temporary battery 22 exceeds a predetermined SOCt, supplies it to the main battery 18.

Figure 4:
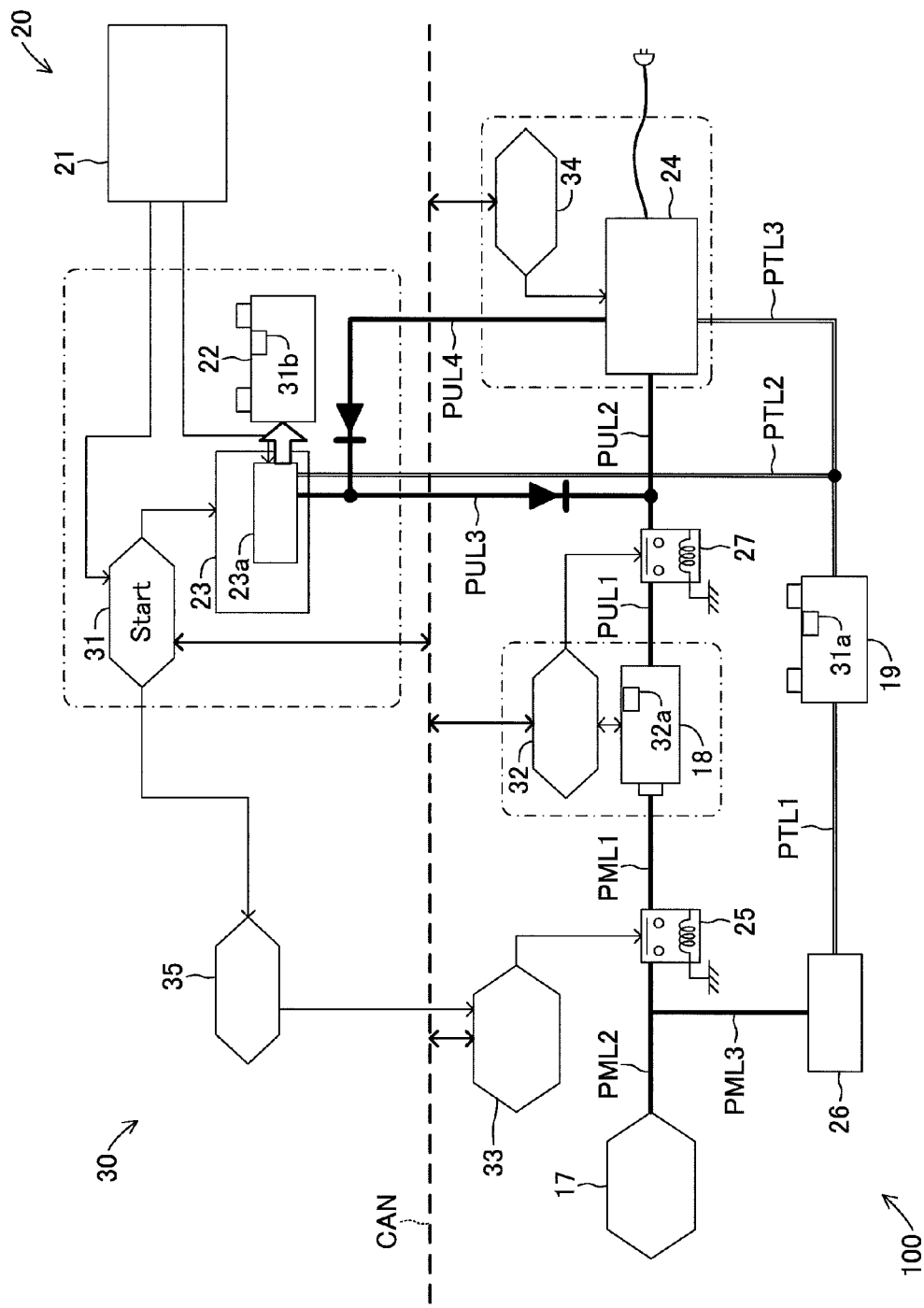
FIG. 4 is a figure for explaining a case where the charge destination of the electric power generated by the in-vehicle solar cell is a temporary electric storage device (temporary battery) temporarily.

Hereafter, the above will be explained step by step.

a) Preferential Supply of Surplus Electric Power (P−L1) to Sub-Battery 19 with SOC of Predetermined SOCs or Less In a situation where a power generation amount P larger than the power consumption L1 by the solar ECU31 itself is supplied from the in-vehicle solar cell 21 to the solar ECU31, the solar ECU31 supplies a surplus electric power (P−L1) to the sub-battery 19 when the SOC of the sub-battery 19 acquired from the charge sensor 31a is an SOCs which is a predetermined amount of charge for the sub-battery 19, as shown in FIG. 3. Namely, the solar ECU31 chooses the sub-battery 19 as an electric power supply destination through the charge control circuit 23a of the solar charger 23, transforms the surplus electric power (P−L1) into a predetermined voltage through a DC/DC converter for low-voltage charge, and rectifies it. And, the solar ECU31 supplies the surplus electric power (P−L1) to the sub-battery 19 through the low-voltage power-supply line PTL2, and stores the electricity.

b) Supply of Surplus Electric Power (P−L1) to Temporary Battery 22 when SOC of Sub-Battery 19 Exceeds Predetermined SOCs When the SOC of the sub-battery 19 acquired from the charge sensor 31a exceeds an SOCs which is a predetermined amount of charge, the solar ECU31 supplies the surplus electric power (P−L1) to the temporary battery 22, as shown in FIG. 4. Namely, the solar ECU31 chooses the temporary battery 22 as an electric power supply point through the charge control circuit 23a of the solar charger 23, converts the surplus electric power (P−L1) into a predetermined voltage through a DC/DC converter for low-voltage charge, and rectifies it. And, the solar ECU31 supplies the surplus electric power (P−L1) to temporary battery 22, and stores the electricity. Here, the charging time ft required for charging the surplus electric power (P−L1) in the temporary battery 22 can be represented by a formula tt=ΔSOC/eNi_in (P−L1), wherein ΔSOC is a variation of SOC in the temporary battery 22 and eNi_in is an efficiency of supplying an electric power from the charge control portion circuit 23a to the temporary battery 22.

Here, in cases of the above-mentioned a) and b) in which the solar ECU31 chooses the sub-battery 19 or the temporary battery 22 as an electric power supply destination, it is not necessary to largely boost the surplus electric power (P−L1), i.e., the electric power by a photovoltaic power generation, and only a low-voltage power supply is treated. In other words, in case of c) in which the solar ECU31 chooses the main battery 18 as an electric power supply destination, it is necessary to treat the high-voltage power supply which is obtained by largely boosting the electric power by a photovoltaic power generation (more particularly, an electric power stored in a temporary electric storage device). And, in order to deal with such a high-voltage power supply, in order to secure a reliability and safety, complication of a system management and charge control cannot be avoided. On the contrary to this, in a case where the sub-battery 19 with its SOC of the predetermined SOCs or less is preferentially chosen first and the temporary battery 22 is chosen next, a low-voltage power supply can be dealt similarly to a conventional vehicle, such as EV, HV and PHV and, as a result, a system control and charge control can be simplified.

c) Supply of Electric Power of Temporary Battery 22 to Main Battery 18 when SOC of Temporary Battery 22 Exceeds Predetermined SOCt In this case, it is in a status that the SOC of the sub-battery 19 has exceeded the SOCs which is a predetermined amount of charge, and the SOC of the temporary battery 22 has exceeded SOCt which is a predetermined amount of charge. For this reason, the solar ECU31 supplies the surplus electric power (P−L1) to the operation of a plurality of auxiliary machines and a plurality of electronic control instruments mounted on the vehicle 100, through the charge control circuit 23a of the solar charger 23 of the electric power supply portion 20 and consumes it. And, since the surplus electric power (P−L1) is insufficient to the total power consumption Lall consumed in association with the operation of a plurality of auxiliary machines and a plurality of electronic control instruments, the solar ECU31 supplies the insufficiency of an electric power from the temporary battery 22 of the electric power supply portion 20. In addition, in this case, it is also possible to supply the insufficiency of an electric power from the sub-battery 19 in place of the temporary battery 22.

On the other hand, since the amount of charge in the temporary battery 22 is over the SOCt, the solar ECU31 pumps up an electric power from the temporary battery 22, what is called a pumping is carried out, and supplies it to the main battery 18 to control charging. Hereafter, a control of charging to the main battery 18 by pumping will be explained concretely.

Figure 5:
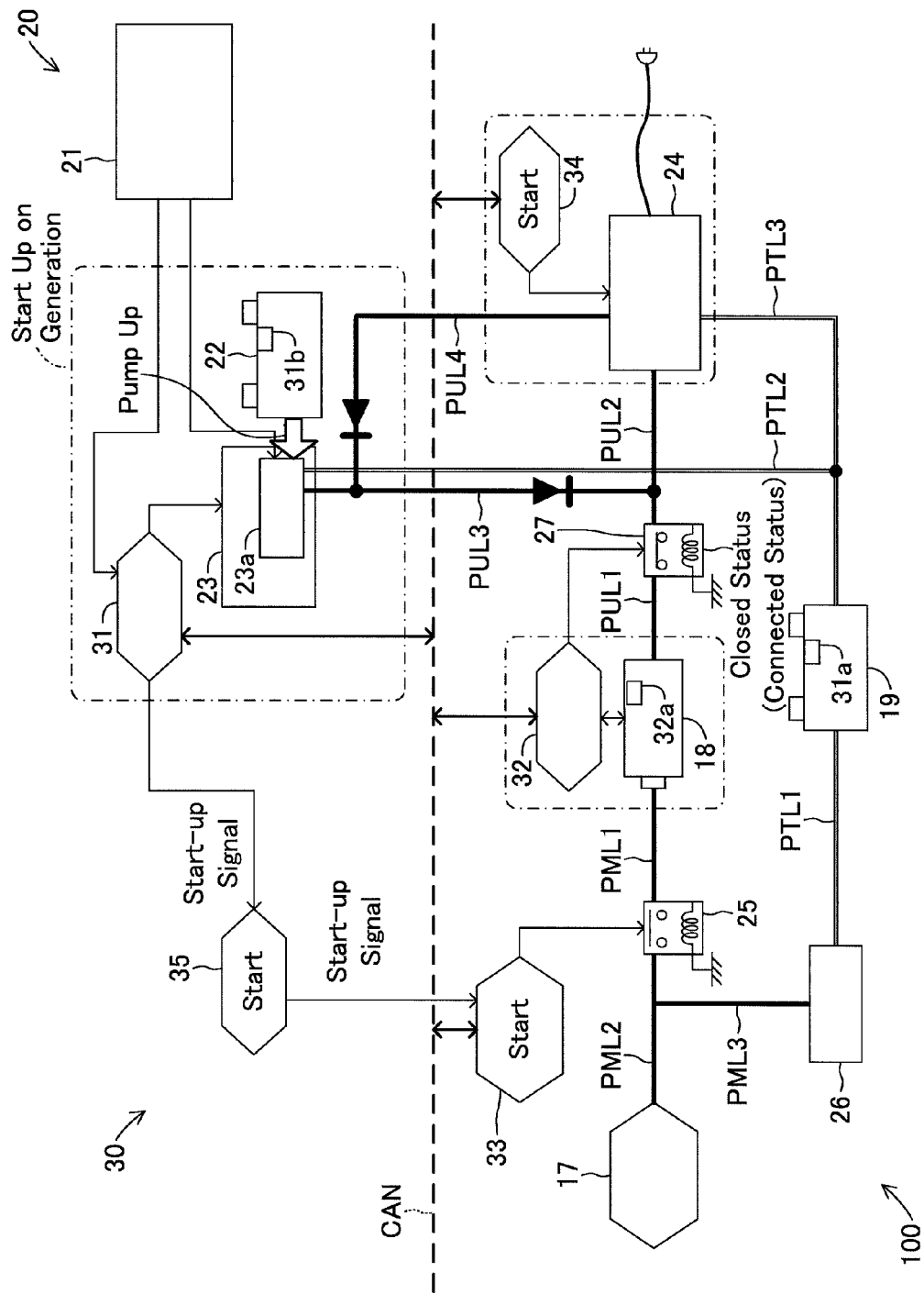
FIG. 5 is a figure for explaining a control for pumping the electric power of the temporary electric storage device (temporary battery) and charging the main electric storage devices (main battery) in a case where the power generation by the in-vehicle solar cell is small.

Since it is not necessary to feed a high-voltage power supply to the motor generator 14 when it is judged, based on a detected vehicle speed etc., that the vehicle 100 are parking or stopping, for example, the hybrid ECU22 switches the system main electric relay 25 to an opened status (disconnected status), as shown in FIG. 5. Thus, when the hybrid ECU33 switches the system main electric relay 25 to an opened status (disconnected status), the vehicle 100 will be in a status that it does not run, at least, with the driving force of the motor generator 14, a status of what is called "Ready OFF".

Thus, when the vehicle 100 is in a status of "Ready OFF", the cell ECU32 can switch the electric relay 27 for charge to a closed status (connected status), as shown in FIG. 5. Thereby, when an ignition (I/G) is operated by a driver to be in an OFF-state and the vehicle 100 is parking or stopping (i.e., the vehicle 100 is not running), the solar ECU31 supplies the electric power by the photovoltaic power generation which is temporarily stored in the temporary battery 22 temporarily to the main battery 18 and stores the electricity. In addition, in this case, a fact that no charging stand is electrically connected to the plug-in charger 24, i.e., there is no means for supplying an electric power to the main battery 18 other than the solar charger 23, may be further added to the condition.

Here, as mentioned above, in order to deal with a high-voltage power supply safely, a plurality of electrical apparatus including the system main electric relay 25 and the electric relay 27 for charge is prepared around the main battery 18. Moreover, in order to monitor the status of the main battery 18 and to control charging to the main battery 18, it is necessary to operate the cell ECU32 and the hybrid ECU33 etc., at least. And, an electric power is consumed for operating a plurality of these electrical apparatus and a plurality of these ECUs (a plurality of electronic control instruments).

For this reason, in a case where the electric power by a photovoltaic power generation is supplied to and stored in the main battery 18, when an electric power which is at least the power consumption by a plurality of electrical apparatus or more is temporarily charged in the temporary battery 22, i.e., when the SOC of the temporary battery 22 exceeds a SOCt set up based on the power consumption by a plurality of electrical apparatus, the solar ECU31 performs charge control by pumping. Thus, in a situation where the temporary battery 22 stores the electric power by a photovoltaic power generation which is the power consumption or more (SOCt or more), even when an electric power is consumed in association with the operation of a plurality of the above-mentioned electrical apparatus and ECUs, the electric power by a photovoltaic power generation can be charged in the main battery 18.

Concretely, the solar ECU31 judges whether an SOC acquired from the charge sensor 31*b* is larger than an SOCt set up based on the above described power consumption. Here, by carrying out the pumping to control charging to the main battery 18 whenever the electric power by a photovoltaic power generation is supplied based on the priority mentioned above and the SOC of the temporary battery 22 becomes larger than the SOCt, the frequency where a plurality of electrical apparatus and a plurality of ECUs are operated (started up) can be reduced. Thereby, the electric power consumed whenever a plurality of electrical apparatus and a plurality of ECUs are operated (started up), in other words, the power consumption by operating an instrument required for charging the main battery 18, can be reduced, and the electric power by a photovoltaic power generation can be charged efficiently in the main battery 18.

And, when the electric power by a photovoltaic power generation is charged until the SOC of the temporary battery 22 exceeds the SOCt, the solar ECU31 starts up the hybrid ECU33 and the cell ECU32 which collaborates with this ECU33, in order to output a start-up signal through collation by the collation ECU35 and to charge the main battery 18 safely, as shown in FIG. 5. Thus, the hybrid ECU33 which has been started up with the outputted start-up signal maintains the system main electric relay 25 to an opened status (disconnected status). Moreover, the cell ECU32 which has been started up with the start-up signal switches the electric relay 27 for charge from an opened status (disconnected status) to a closed status (connected status), and connects the charge power supply line PUL1 on the side of the main battery 18 and the charge power supply line PUL2 on the side of the solar charger 23.

And, especially, when the electric relay 27 for charge is switched to a closed status (connected status) by the cell ECU32, the solar ECU31 is pumps up the low-pressure electric power temporarily charged in the temporary battery 22 for a short time (carries out a pumping), boosts it to a predetermined voltage by the DC/DC converter for high-voltage charge in the charge control circuit 23*a* of the solar charger 23 and rectifies it, and supplies the electric power transformed to a high voltage to the main battery 18 through the charge power supply line PUL3 and the charge power supply line PUL2. Thereby, the cell ECU32 can charge the electric power supplied from the solar charger 23 (solar ECU31) (electric power by a photovoltaic power generation) in the main battery 18 in accordance with a well-known charge control.

Here, tp is defined as charging time to the main battery 18, ΔSOC is defined as an electric energy supplied from the temporary battery 22, eNi_out is defined as an efficiency of supplying an electric power from the temporary battery 22 to the charge control portion circuit 23*a*, D is defined as power consumption by the DC/DC converter for high-voltage charge of the charge control portion circuit 23*a*, eLi_in is defined as an efficiency of supplying an electric power from the DC/DC converter for high-voltage charge of the charge control portion circuit 23*a* to the main battery 18, and C is defined as the amount of charge to the main battery 18 per one pumping. Then, in accordance with the law of conservation of energy, a formula P·tp+ΔSOC·eNi_out=Lall·tp+D·tp is satisfied. And, the charging time tp to the main battery 18 can be expressed as tp=ΔSOC/eNi_out (−P+Lall+D), and the amount C of charge to the main battery 18 per one pumping can be expressed as C=eDCDC·D·eLi_in·tp. Here, eDCDC shows an efficiency of the DC/DC converter for high-voltage charge.

In addition, in this case, in order to operate a plurality of electrical apparatus and a plurality of ECUs, the electric power in the sub-battery 19 is consumed. For this reason, only during the above-mentioned pumping-up of electric power (during the pumping), the solar ECU31 can rectify a low-voltage electric power temporarily charged in the temporary battery 22 by the DC/DC converter for low-voltage charging in the charge control circuit 23*a* of the solar charger 23 and supply an electric power to the sub-battery 19 through the low-voltage power-supply line PTL2. Thereby, the amount of charge in the sub-battery 19 can be recovered, and what is called "death of battery" of the sub-battery 19 can be prevented from occurring.

(2) Case of Lall<P

Also when the power generation amount P by the in-vehicle solar cell 21 is larger than the total power consumption Lall (predetermined electric power) by a plurality of auxiliary machines, etc., similarly to the above-mentioned case of (1) L1<P≤Lall, the solar ECU31 started by being provided with the electric power by a photovoltaic power generation, controls charging in accordance with the following order. a) The surplus electric power (P−L1) is supplied to the sub-battery 19 whose SOC is a predetermined SOCs or less, b) when the SOC of the sub-battery 19 exceeds the predetermined SOCs, the surplus electric power (P−L1) is supplied to the temporary battery 22, and c) when the SOC of the temporary battery 22 exceeds a predetermined SOCt, it is supplied to the main battery 18. However, only the control of the charge to the main battery 18 in c) is different.

Namely, when the power generation amount P by the in-vehicle solar cell 21 is larger than the total power consumption Lall by a plurality of auxiliary machines, etc., all electric powers required for operating a plurality of auxiliary machines, etc., can be provided with the electric power by a photovoltaic power generation. Therefore, in this case, as shown in FIG. 6, the solar ECU31 pumps up and supplies the electric power charged in the temporary battery 22 over the SOCt similarly to the case of the above-described (1), and supplies the surplus electric power (P−Lall) which is obtained by subtracting the total power consumption Lall from the power generation amount P to the main battery 18.

Figure 6:
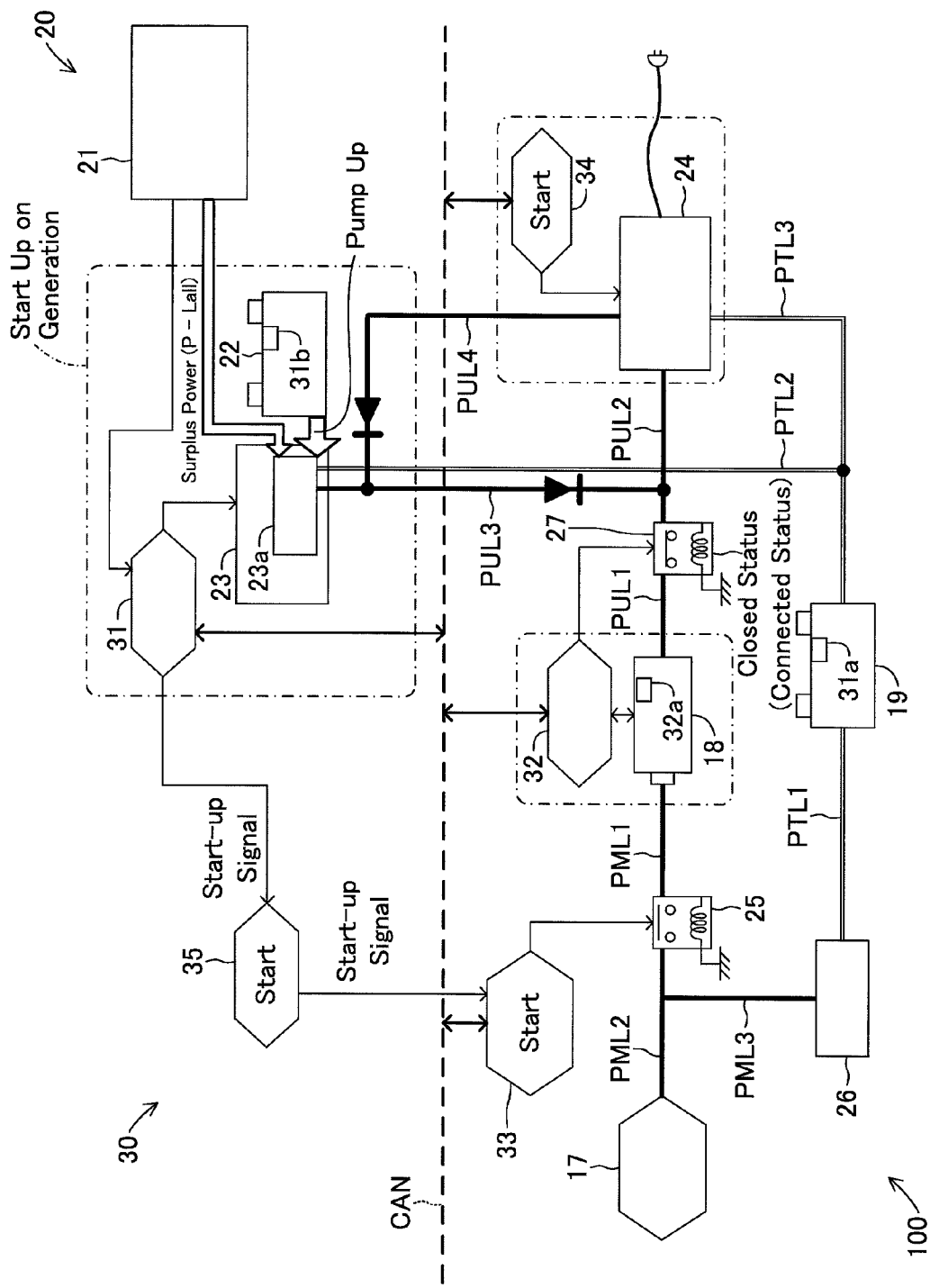
FIG. 6 is a figure for explaining a control for pumping the electric power of the temporary electric storage device (temporary battery) and charging the main electric storage devices (main battery) in a case where the power generation by the in-vehicle solar cell is large.

Specifically, when the electric power by a photovoltaic power generation has been stored until the SOC of the temporary battery 22 exceeds the SOCt, the solar ECU31 starts up the hybrid ECU33 and the cell ECU32 which operates in collaboration with this ECU33 similarly to the case of c) in the above (1), as shown in FIG. 6. Thereby, while the hybrid ECU33 maintains the system main electric relay 25 in an opened status (disconnected status), the cell ECU32 switches the electric relay 27 for charge from an opened status (disconnected status) to a closed status (connected status), and connects the charge power supply line PUL1 on the side of the main battery 18 and the charge power supply line PUL2 on the side of the solar charger 23.

And, the solar ECU31 pumps up a low-pressure electric power temporarily charged in the temporary battery 22 by the DC/DC converter for high-voltage charge in the charge control circuit 23a of the solar charger 23 of the electric power supply portion 20, and, the low-voltage surplus electric power (P−Lall) supplied from the in-vehicle solar cell 21 and boosts them to a predetermined voltage, for a short time, and rectifies them, and supplies the electric power, which has been transformed to a high voltage, to the main battery 18 through the charge power supply line PUL3 and the charge power supply line PUL2. Thereby, the cell ECU32 can charge the electric power supplied from the Solar charger 23 (Solar ECU31) (electric power by a photovoltaic power generation) in the main battery 18 in accordance with a well-known charge control.

As can be understood from the above explanation, in accordance with the above described embodiment, the solar ECU31 which constitutes the charge controller 30 can directly receive the generated electric power supply without passing through a lag element, such as an electrical-double-layer capacitor, from the in-vehicle solar cell 21 of the electric power supply portion 30, for example. Thereby, for example, regardless of the charge status of the sub-battery 19 which supplies an electric power to the charge controller 30, a start-up voltage can rise promptly with the electric power supplied from the in-vehicle solar cell 21 and the solar ECU31 can start up promptly. And, the started solar ECU31 can control the charge to the main battery 18, the sub-battery 19 and the temporary battery 22.

Namely, first, the solar ECU31 can supply the remaining surplus electric power (P−L1) that is obtained by subtracting the power consumption L1 accompanying a control of charge from the power generation amount P generated by the in-vehicle solar cell 21 preferentially to the sub-battery 19, and can store the electricity. Thereby, the amount of charge (SOC) of the sub-battery 19 can be secured sufficiently, and the cell ECU32 and the hybrid ECU33 etc. constituting the charge controller 30 which receives a feeding of an electric power from the sub-battery 19 can be started up. Moreover, in accordance with the amount of charge (SOC) of the sub-battery 19 having exceeded a predetermined SOCs, the solar ECU31 can supply a surplus electric power (P−L1) to the temporary battery 22, and can store electricity. And, in accordance with the amount of charge (SOC) of the temporary battery 22 having exceeded a predetermined SOCt, the solar ECU31 can pump up and boost (i.e., carry out pumping) the temporarily stored electric power and supply it to the main battery 18. Therefore, the electric power generated by the in-vehicle solar cell 21, in other words, renewable energy, can be effectively used without being discarded futilely.

Moreover, even in a situation where the solar ECU31 is carrying out the pumping of the electric power of the temporary battery 22 and is controlling charge of the main battery 18, the solar charger 23 can supply the electric power which the in-vehicle solar cell 21 is continuously generating, in other words, renewable energy, to the solar ECU31 (and the sub-battery 19) or/and the main battery 18. More specifically, when the electric power generated by the in-vehicle solar cell 21, i.e., power generation amount P, is the total power consumption Lall or less, the solar charger 23 can supply the generated electric power from the in-vehicle solar cell 21 to the solar ECU31 (and the sub-battery 19). On the other hand, when the power generation amount P is larger than the total power consumption Lall, the solar charger 23 can supply the generated electric power from the in-vehicle solar cell 21 to the solar ECU31 and the main battery 18. Therefore, the electric power generated by the in-vehicle solar cell 21, in other words, renewable energy, can be effectively used, without being discarded futilely.

Implementation of the present invention is not limited to the above-mentioned embodiment, and various modifications are possible unless it deviates from the objective of the present invention.

For instance, in the above-mentioned embodiment, the in-vehicle solar cell 21 generates electricity, and the solar ECU31 starts up using this generated electric power to perform the control of charge. In this case, for example, in bad weather or at night-time, or in a garage, a situation where the in-vehicle solar cell 21 cannot generate electricity may arise. Moreover, also when a failure occurs in the in-vehicle solar cell 21, a situation where generation cannot be done may arise. And, in such cases, the start-up of the solar ECU31 itself may become impossible, as mentioned above. In such a situation (state of emergency), it is also possible for the cell ECU32 which constitutes the charge controller 30, etc. to compulsorily charge from these batteries 18 and 22 at the sub-battery 19, even if the SOC is decreased, irrespective of the amount of charge (SOC) of the main battery 18 or/and the temporary battery 22. Thus, an electric power is supplied from the main battery 18 or/and the temporary battery 22 to the sub-battery 19 in a state of emergency, and thereby it becomes possible for the charge controller 30 including the solar ECU31 to be started up. In an HV or PHV, it becomes to operate the engine 11 to charge the main battery 18, for instance.

Figure 7:
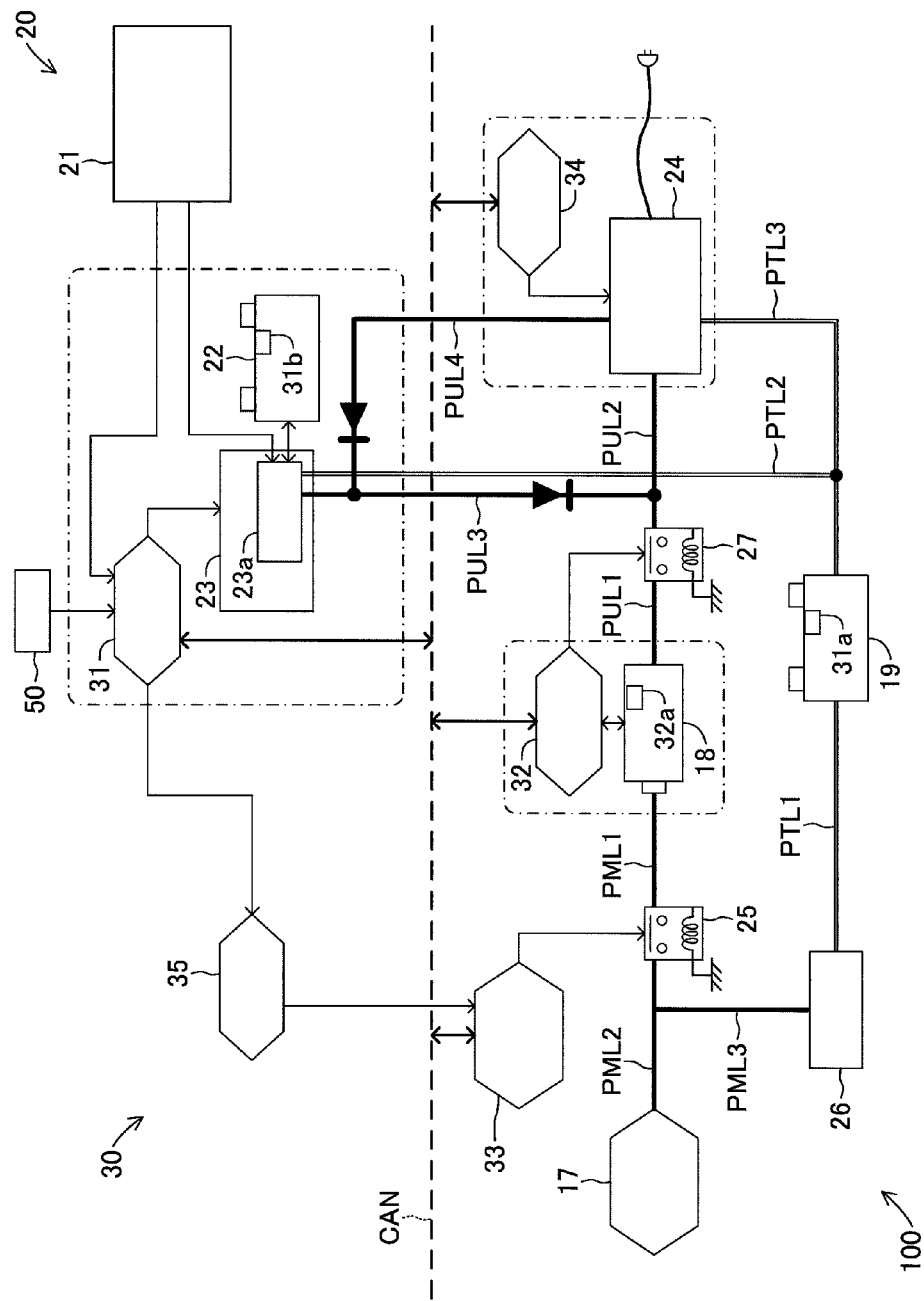
FIG. 7 is a block diagram for schematically showing a charge control device using an in-vehicle solar cell and according to a modification of the present invention.

Moreover, when such a state of emergency arises, as shown in FIG. 7, it is also possible to prepare a switch 50 which a driver operates based on judgment on the state of emergency, to reflect the man's intention by an operation of this switch 50, and to compulsorily supply an electric power from the main battery 18 or the temporary battery 22 to the sub-battery 19. Thus, the reliability of the charge system itself can be improved by reflecting the intention of the man (driver) based on the existence of an operation of the switch 50.

Furthermore, in the above-mentioned embodiment, the electric power supply portion 20 of the vehicle 100 comprises the temporary battery 22, and this temporary battery 22 temporarily charges the electric power by a photovoltaic power generation which is generated by the in-vehicle solar cell 21. In this case, it is also possible to omit to physically install the temporary battery 22 in the vehicle 100 and temporarily charge the electric power by a photovoltaic power generation by using (sharing) the sub-battery 19.

Thereby, the sub-battery 19 can has a function which is demonstrated by the temporary battery 22 and temporarily charge the electric power by the photovoltaic power generation, which the in-vehicle solar cell 21 has generated. Therefore, while increase in cost generated by preparing the temporary battery 22 can be suppressed, it is not necessary to secure a space for disposing the temporary battery 22. Therefore, the space can be conserved, and a weight saving can also be attained. As for other effects, the same effects as the above-mentioned embodiment can be acquired.

The invention claimed is:

1. A charge control device using an in-vehicle solar cell, which is applied to a vehicle that has a generator motor for generating a driving force and a main electric storage device electrically connected with said generator motor to supply an electric power thereto and that can run using at least said driving force generated by said generator motor, and comprises, an electric power supply portion that has said in-vehicle solar cell mounted on said vehicle and a temporary electric storage device for temporarily storing the electric power generated by said in-vehicle solar cell, and a charge control portion which controls charging of said main electric storage device and said temporary electric storage device, in cooperation with said electric power supply portion, wherein:

when the amount of charge of said temporary electric storage device exceeds a predetermined amount of charge and said charge control portion is performing a pumping charge in which the electric power temporarily stored in said temporary electric storage device is pumped up and boosted, and charged in said main electric storage device, said electric power supply portion:

supplies the electric power generated by said in-vehicle solar cell to said charge control portion from said in-vehicle solar cell when the electric power generated by said in-vehicle solar cell is less than or equal to a predetermined electric power, and supplies the electric power generated by said in-vehicle solar cell to said charge control portion and said main electric storage device from said in-vehicle solar cell when the electric power generated by said in-vehicle solar cell is greater than said predetermined electric power.

2. The charge control device using said in-vehicle solar cell according to claim 1, wherein:

said predetermined electric power is set up based on a total power consumption consumed by the operations of a plurality of auxiliary machines and a plurality of electronic control instruments mounted on said vehicle, said electric power supply portion, when the electric power generated by said in-vehicle solar cell is larger than a predetermined electric power set up based on said total power consumption, while supplying the generated electric power from said in-vehicle solar cell to a plurality of auxiliary machines and a plurality of electronic control instruments mounted on said vehicle, supplies a remaining surplus electric power obtained by subtracting said total power consumption from the generated electric power, from said in-vehicle solar cell to said main electric storage device.

3. The charge control device using said in-vehicle solar cell according to claim 2, wherein:

said electric power supply portion, when the electric power generated by said in-vehicle solar cell is a predetermined electric power set up based on said total power consumption or less, while supplying the generated electric power from said in-vehicle solar cell to said charge control portion, supplies a remaining surplus electric power obtained by subtracting power consumption consumed in association with the operation of said charge control portion from the generated electric power, from said in-vehicle solar cell to a plurality of auxiliary machines and a plurality of electronic control instruments mounted on said vehicle.

* * * * *